United States Patent
Inoue et al.

(10) Patent No.: US 10,917,575 B2
(45) Date of Patent: Feb. 9, 2021

(54) PORTABLE INFORMATION DEVICE HAVING REAL-TIME DISPLAY WITH RELEVANT INFORMATION

(71) Applicant: NIKON CORPORATION, Tokyo (JP)

(72) Inventors: Hideya Inoue, Yokohama (JP); Toru Iwaoka, Amsterdam (NL); Michiko Noborisaka, Yokohama (JP); Masayuki Hatori, Soka (JP); Tomohide Hamada, Yokohama (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 15/648,777

(22) Filed: Jul. 13, 2017

(65) Prior Publication Data

US 2017/0310900 A1    Oct. 26, 2017

Related U.S. Application Data

(62) Division of application No. 14/247,737, filed on Apr. 8, 2014, now Pat. No. 9,743,003, which is a division
(Continued)

(30) Foreign Application Priority Data

Aug. 8, 2008  (JP) ................................. 2008-205729

(51) Int. Cl.
H04N 5/232    (2006.01)
H04N 1/00    (2006.01)
H04N 1/32    (2006.01)

(52) U.S. Cl.
CPC ... H04N 5/232933 (2018.08); H04N 1/00244 (2013.01); H04N 1/00307 (2013.01);
(Continued)

(58) Field of Classification Search
CPC ........... H04N 5/23293; H04N 1/00411; H04N 1/00307; H04N 2201/3273;
(Continued)

(56) References Cited

U.S. PATENT DOCUMENTS 6,037,936 A * 3/2000 Ellenby .................. G01C 17/34
348/211.8
6,282,362 B1   8/2001 Murphy et al.
(Continued)

FOREIGN PATENT DOCUMENTS

CN    1742265 A    3/2006
CN    1926559 A    3/2007
(Continued)

OTHER PUBLICATIONS

Feb. 3, 2015 Office Action issued in Japanese Application No. 2014-116159.
(Continued)

Primary Examiner — Hung H Lam
(74) Attorney, Agent, or Firm — Oliff PLC

(57) ABSTRACT

A portable information device including a body, a position information portion that is provided in the body and that outputs position information, an image sensor that is provided in the body, a display system that is provided in the body and that displays, on a local field in a screen field, relevant information based on the position information such that the displayed relevant information is overlapped on a real-time image, an input portion that is provided on the body and, by use of which user operates an icon, the icon being displayed on the local field such that the displayed icon is overlapped on the real-time image and an imaging button that is provided, separately from the input portion, on the body and that is operated by user to capture a subject image via the image sensor.

20 Claims, 8 Drawing Sheets

Related U.S. Application Data of application No. 12/461,324, filed on Aug. 7, 2009, now Pat. No. 8,730,337.

(60) Provisional application No. 61/136,294, filed on Aug. 26, 2008.

(52) U.S. Cl.
CPC ..... *H04N 1/00411* (2013.01); *H04N 1/32117* (2013.01); *H04N 5/23293* (2013.01); *H04N 2201/0084* (2013.01); *H04N 2201/3205* (2013.01); *H04N 2201/3253* (2013.01); *H04N 2201/3273* (2013.01); *H04N 2201/3276* (2013.01)

(58) Field of Classification Search
CPC ... H04N 2201/3253; H04N 2201/0084; H04N 2201/3205; H04N 2201/3274; H04N 2201/3276; H04N 2201/3277; H04N 1/00244
USPC .................................................... 348/333.01
See application file for complete search history.

(56) References Cited

U.S. PATENT DOCUMENTS

| | | | |
|---|---|---|---|
| 6,734,910 B1* | 5/2004 | Yumoto | H04N 1/2112 348/231.3 |
| 6,750,890 B1* | 6/2004 | Sugimoto | G06T 1/00 345/594 |
| 7,016,899 B1 | 3/2006 | Stern et al. | |
| 7,355,620 B2* | 4/2008 | Ikehata | G06F 3/04883 345/173 |
| 7,408,137 B2 | 8/2008 | Sawachi | |
| 7,490,294 B2 | 2/2009 | Okada | |
| 7,720,436 B2* | 5/2010 | Hamynen | G06F 17/3087 348/116 |
| 7,826,967 B2* | 11/2010 | Jung | G01C 21/3679 348/231.1 |
| 7,847,776 B2 | 12/2010 | Ishii | |
| 7,916,948 B2 | 3/2011 | Takahashi et al. | |
| 7,941,271 B2* | 5/2011 | Ofek | G01C 21/00 701/412 |
| 7,979,428 B2 | 7/2011 | Miyajima et al. | |
| 8,010,279 B2 | 8/2011 | Kobuya et al. | |
| 8,014,792 B2 | 9/2011 | Sato et al. | |
| 8,228,412 B2 | 7/2012 | Hiratsuka | |
| 8,254,727 B2* | 8/2012 | Ko | G06F 3/0481 382/103 |
| 8,280,405 B2 | 10/2012 | Sanz-Pastor et al. | |
| 8,291,100 B2 | 10/2012 | Ogasawara et al. | |
| 8,497,910 B2 | 7/2013 | Tanaka et al. | |
| 8,564,710 B2 | 10/2013 | Nonaka et al. | |
| 8,665,325 B2 | 3/2014 | Casey et al. | |
| 9,288,079 B2 | 3/2016 | Douris et al. | |
| 9,852,462 B2* | 12/2017 | Manber | G01C 21/3644 |
| 2003/0078841 A1 | 4/2003 | Hirayama | |
| 2004/0070602 A1 | 4/2004 | Kobuya et al. | |
| 2004/0189813 A1 | 9/2004 | Tanaka | |
| 2005/0046706 A1 | 3/2005 | Sesek et al. | |
| 2005/0055353 A1 | 3/2005 | Marx et al. | |
| 2005/0162523 A1* | 7/2005 | Darrell | G06F 17/30277 348/211.2 |
| 2006/0001757 A1 | 1/2006 | Sawachi | |
| 2006/0036491 A1 | 2/2006 | Leung et al. | |
| 2006/0114336 A1* | 6/2006 | Liu | H04N 9/8205 348/231.3 |
| 2006/0117097 A1 | 6/2006 | Ogasawara et al. | |
| 2006/0193623 A1 | 8/2006 | Funakura | |
| 2006/0204232 A1 | 9/2006 | Weinberg et al. | |
| 2006/0250507 A1* | 11/2006 | Miyajima | G06F 17/30265 348/231.5 |
| 2007/0165968 A1 | 7/2007 | Terayoko | |
| 2007/0189612 A1 | 8/2007 | Takahashi et al. | |
| 2007/0200713 A1 | 8/2007 | Weber et al. | |
| 2007/0249367 A1 | 10/2007 | Sato et al. | |
| 2007/0275691 A1 | 11/2007 | Boda | |
| 2007/0275765 A1 | 11/2007 | Chao et al. | |
| 2007/0291303 A1 | 12/2007 | Tanaka et al. | |
| 2008/0020796 A1 | 1/2008 | Hamamura et al. | |
| 2008/0024632 A1 | 1/2008 | Otsuka | |
| 2008/0071559 A1 | 3/2008 | Arrasvuori | |
| 2008/0142599 A1 | 6/2008 | Benillouche et al. | |
| 2008/0147730 A1 | 6/2008 | Lee et al. | |
| 2008/0186196 A1* | 8/2008 | Lessing | G06Q 10/109 340/686.6 |
| 2008/0285886 A1* | 11/2008 | Allen | G06F 17/30241 382/284 |
| 2009/0040305 A1* | 2/2009 | Krajec | G01S 5/0257 348/144 |
| 2009/0096875 A1 | 4/2009 | Yoshimaru et al. | |
| 2009/0137279 A1 | 5/2009 | Silfverberg | |
| 2009/0177987 A1 | 7/2009 | Jayakody | |
| 2009/0193021 A1* | 7/2009 | Gupta | G06F 17/3028 |
| 2009/0198661 A1 | 8/2009 | Miyajima et al. | |
| 2009/0280838 A1* | 11/2009 | Malik | H04N 1/00323 455/456.6 |
| 2010/0023878 A1 | 1/2010 | Douris et al. | |
| 2010/0039505 A1 | 2/2010 | Inoue et al. | |
| 2010/0257056 A1 | 10/2010 | Yeon et al. | |
| 2011/0161875 A1 | 6/2011 | Kankainen | |
| 2012/0038671 A1 | 2/2012 | Min et al. | |
| 2012/0044263 A1 | 2/2012 | Kim et al. | |
| 2014/0092291 A1 | 4/2014 | Aoshima et al. | |
| 2014/0218581 A1 | 8/2014 | Inoue et al. | |
| 2014/0362111 A1 | 12/2014 | Kim | |
| 2017/0310900 A1 | 10/2017 | Inoue et al. | |

FOREIGN PATENT DOCUMENTS

| | | |
|---|---|---|
| CN | 101118162 A | 2/2008 |
| EP | 1 703 426 A1 | 9/2006 |
| EP | 1 939 684 A1 | 7/2008 |
| EP | 2321954 B1 | 4/2020 |
| JP | H11-211993 A | 8/1999 |
| JP | 2001-169164 A | 6/2001 |
| JP | 2001-216309 A | 8/2001 |
| JP | 2001-251546 A | 9/2001 |
| JP | 2001-357279 A | 12/2001 |
| JP | 2002-015078 A | 1/2002 |
| JP | 2002-094870 A | 3/2002 |
| JP | 2002-334256 A | 11/2002 |
| JP | 2003-098956 A | 4/2003 |
| JP | 2003-153142 A | 5/2003 |
| JP | 2003-174578 A | 6/2003 |
| JP | 2003-271607 A | 9/2003 |
| JP | 2004-015187 A | 1/2004 |
| JP | 2004-021548 A | 1/2004 |
| JP | 2004-070598 A | 3/2004 |
| JP | 2004-272592 A | 9/2004 |
| JP | 2004-341960 A | 12/2004 |
| JP | 2005-123947 A | 5/2005 |
| JP | 2005-174240 A | 6/2005 |
| JP | 2005-265551 A | 9/2005 |
| JP | 2005-309528 A | 11/2005 |
| JP | 2006-003963 A | 1/2006 |
| JP | 2006-020166 A | 1/2006 |
| JP | 2006-050425 A | 2/2006 |
| JP | 2006-171959 A | 6/2006 |
| JP | 2006-185006 A | 7/2006 |
| JP | 2006-194665 A | 7/2006 |
| JP | 2006-235979 A | 9/2006 |
| JP | 2006-260338 A | 9/2006 |
| JP | 2006-338638 A | 12/2006 |
| JP | 2007-280371 A | 10/2007 |
| JP | 2007-336403 A | 12/2007 |
| JP | 2008-034963 A | 2/2008 |
| JP | 2008-077311 A | 4/2008 |
| JP | 2008-111693 A | 5/2008 |
| JP | 2008-210364 A | 9/2008 |
| JP | 2008-250474 A | 10/2008 |

(56) References Cited

FOREIGN PATENT DOCUMENTS

| | | |
|---|---|---|
| JP | 2009-017540 A | 1/2009 |
| JP | 2009-060339 A | 3/2009 |
| JP | 2011-530838 A | 12/2011 |
| TW | M306340 U | 2/2007 |
| TW | 200744352 A | 12/2007 |
| WO | 2010/016626 A1 | 2/2010 |

OTHER PUBLICATIONS

Mar. 10, 2015 Rexamination Notice issued in Chinese Application No. 200980129777.5.
Aug. 13, 2015 Reexamination Notice issued in Chinese Application No. 200980129777.5.
May 1, 2015 Office Action issued in Taiwanese Application No. 102122684.
Dec. 16, 2015 Office Action issued in Taiwanese Application No. 102122684.
Feb. 15, 2016 Decision of Reexamination issued in Chinese Application No. 200980129777.5.
Apr. 7, 2016 Office Action Issued in U.S. Appl. No. 14/247,737.
Aug. 16, 2016 Office Action issued in Japanese Application No. 2015-200031.
Aug. 20, 2013 Notice of Reasons for Rejection issued in Japanese Patent Application No. 2011-505268.
Jan. 21, 2013 Office Action issued in European Patent Application No. 09 788 033.0.
Feb. 7, 2013 Office Action issued in Taiwanese Patent Application No. 098126507.
Apr. 3, 2013 Office Action issued in Chinese Patent Application No. 200980129777.5.
Mar. 23, 2010 International Search Report issued in International Patent Application No. PCT/JP2010/000990.
Mar. 23, 2010 Written Opinion of the International Searching Authority issued in International Patent Application No. PCT/JP2010/000990.
Takebe, Nikkei Communications, 2008, No. 521. Nikkei Business Publications, Inc., pp. 46-51.
Hashimoto et al., "Outdoor Annotation System by Sensor Fusion," IEICE Technical Report, 2006, vol. 106, No. 234, pp. 97-102.
Oct. 23, 2009 International Search Report issued in International Patent Application No. PCT/JP2009/064330.
Oct. 23, 2009 Written Opinion issued in International Patent Application No. PCT/JP2009/064330.
Mar. 4, 2014 Office Action issued in Japanese Patent Application No. 2011-505268.
Dec. 3, 2013 Office Action issued in Chinese Patent Application No. 200980129777.5.
Jan. 8, 2014 Notice of Allowance issued in U.S. Appl. No. 12/461,324.
Mar. 13, 2012 Office Action issued in U.S. Appl. No. 12/461,324.
Nov. 23, 2012 Office Action issued in U.S. Appl. No. 12/461,324.
Oct. 21, 2016 Office Action issued in U.S. Appl. No. 14/247,737.
Nov. 17, 2015 Office Action issued in U.S. Appl. No. 14/247,737.
Nov. 28, 2014 Office Action issued in U.S. Appl. No. 14/247,737.
May 22, 2015 Office Action issued in U.S. Appl. No. 14/247,737.
Jun. 9, 2014 Office Action issued in U.S. Appl. No. 14/247,737.
Apr. 14, 2017 Notice of Allowance issued in U.S. Appl. No. 14/247,737.
Jul. 27, 2017 Office Action issued in Chinese Application No. 201510359402.5.
Aug. 4, 2017 Office Action issued in Chinese Application No. 201510359026.X.
Jan. 2, 2018 Office Action issued in Indian Patent Application No. 318/KOLNP/2011.
Apr. 3, 2018 Office Action issued in Japanese Patent Application No. 2017-089490.
Apr. 3, 2018 Office Action issued in Chinese Patent Application No. 201610319636.1.
May 3, 2018 Office Action issued in Chinese Patent Application No. 201510359026.X.
May 3, 2018 Office Action issued in Chinese Patent Application No. 201510359402.5.
May 3, 2018 Office Action issued in Chinese Patent Application No. 201510359026.
Jan. 22, 2019 Office Action issued in Chinese Patent Application No. 201610319636.1.
Oct. 2, 2018 Office Action issued in Japanese Patent Application No. 2017-089490.
C.K. Yeo, et al., "Click4BuildingID@NTU: Click for building Identification with GPS-enabled Camera Cell Phone," 2007 IEEE International Conference on Multimedia and Expo (ICME 2007), IEEE, 2007.
Dec. 13, 2018 Office Action issued in European Patent Application No. 09 788 033.0.
Dec. 17, 2018 Office Action issued in Chinese Patent Application No. 201510359026.X.
Dec. 18, 2018 Office Action issued in Chinese Patent Application No. 201510359402.5.
Dec. 27, 2018 Office Action issued in Taiwanese Patent Application 105131608.
Mar. 19, 2019 Office Action issued in European Patent Application No. 09788033.0.
Jul. 2, 2019 Office Action issued in Chinese Patent Application No. 201610319636.1.
Aug. 9, 2019 Office Action issued in Indian Patent Application No. 318/KOLNP/2011.
Mar. 10, 2020 Office Action issued in Japanese patent Application No. 2019-117386.
Mar. 17, 2020 Office Action issued in Japanese patent Application No. 2017-089490.
May 27, 2019 Office Action issued in Chinese Patent Application No. 201510359402.5.
May 27, 2019 Office Action issued in Chinese Patent Application No. 201510359026.X.
Jun. 21, 2019 Summons to Attend Oral Proceedings issued in European Application No. 09788033.0.
Jan. 23, 2020 Office Action issued in Chinese Patent Application No. 201510359026.X.
Aug. 14, 2020 Office Action issued in Chinese Patent Application No. 201510359026.X.
Apr. 30, 2020 Office Action issued in Chinese Patent Application No. 201510359402.5.
May 7, 2020 Office Action issued in Chinese Patent Application No. 201610319636.1.
Sep. 9, 2020 Search Report issued in European Patent Application No. 20168968.4.
Jul. 28, 2020 Decision for Dismissal of Amendment issued in Japanese Patent Application No. 2019-117386.
Sep. 14, 2020 Office Action issued in Chinese Patent Application No. 201610319636.1.
Nov. 20, 2020 Office Action in Chinese Patent Application No. 201510359026.X.

* cited by examiner

FIG. 2

| BUILDING STRUCTURE IDENTIFICATION INFORMATION | NAME OF BUILDING STRUCTURE | BUILDING STRUCTURE INFORMATION | POSITION INFORMATION (LATITUDE AND LONGITUDE) | ORIENTATION INFORMATION | DESCRIPTION | POST INFORMATION |
|---|---|---|---|---|---|---|
| | | | | | | |
| | | | | | | |
| | | | | | | |

PORTABLE INFORMATION DEVICE HAVING REAL-TIME DISPLAY WITH RELEVANT INFORMATION

CROSS-REFERENCE TO RELATED APPLICATIONS

This is a divisional of U.S. application Ser. No. 14/247,737 filed Apr. 8, 2014, which is a divisional of U.S. application Ser. No. 12/461,324 filed Aug. 7, 2009, which is a non-provisional application claiming priority to and the benefit of U.S. provisional application No. 61/136,294, filed Aug. 26, 2008, and claims priority to Japanese Patent Application No. 2008-205729, filed Aug. 8, 2008, the disclosures of which is hereby incorporated herein by reference in its entirety.

BACKGROUND

Field of the Invention

The present invention relates to a portable information device, imaging apparatus, and information acquisition system.

Description of Related Art

Conventionally, there are portable information devices such as imaging apparatuses (for example, digital cameras), which have an imaging function, having a function for detecting the position information of the portable information devices and processing image data, which is acquired by performing imaging, in association with the detected position information (for example, see Japanese Patent Application Publication No. 2004-15187).

A purpose of some aspects of the present invention is to provide a portable information device, an imaging apparatus, and an information acquisition system, that can enhance a user's activity.

SUMMARY

According to an aspect of the present invention, a portable information device is provided, the portable information device including: an image sensor; a position information acquisition portion that outputs position information; an orientation sensor; and a display that displays an image of an object out put from the image sensor and displays relevant information on the object, the relevant information being obtained based on at least measurement data from the position information acquisition portion and the orientation sensor.

According to another aspect of the present invention, an information acquisition system is provided, the information acquisition system including: a server; a database; and a portable information device that comprises an image sensor, a position information acquisition portion that outputs position information, an orientation sensor, a display, and a wireless communication portion, the display displaying an image of an object output from the image sensor and displays relevant information on the object, the relevant information being obtained from the database via the wireless communication portion and the server based on at least measurement data from the position information acquisition portion and the orientation sensor.

According to another aspect of the present invention, an imaging apparatus is provided, the imaging apparatus including: an imaging portion that takes an image of a subject; a position information acquisition portion that acquires position information of an imaging position; and an orientation information acquisition portion that acquires orientation information representing an imaging direction at the imaging position.

According to another aspect of the present invention, an information acquisition is provided, the information acquisition system including: an imaging apparatus; and an information search system. The information search system searches for the information on a subject of which an image is taken by the imaging apparatus and transmits the search result to the imaging apparatus. The imaging apparatus includes: an imaging portion that takes an image of a subject; a position information acquisition portion that acquires position information of an imaging position; and an orientation information acquisition portion that acquires orientation information representing an imaging direction at the imaging position. The information search system includes: a database in which the information on the subject is stored in association with the position information and the orientation information; and an information search server that searches for the information on the subject corresponding to the position information and the orientation information acquired by performing imaging for image data from the database based on the position information and the orientation information of the image data acquired by performing imaging using the imaging apparatus.

According to another aspect of the present invention, a portable information device is provided, the portable information device including: a position information acquisition portion that outputs position information; a display; and a control portion that displays information on an object and an image of the object so as to be associated with each other, the information on the object being obtained based on at least the position information from the position information acquisition portion, and on data used for identifying the object that is imaged at an imaging position, the imaging position being on the basis of the position information.

According to some aspects of the present invention, a portable information device, an imaging apparatus, and an information acquisition system, that can enhance a user's activity, are provided.

BRIEF DESCRIPTION OF THE DRAWINGS

FIG. 2 is a schematic diagram representing a configuration example of a building structure table that is stored in a database represented in FIG. 1.

DESCRIPTION OF EMBODIMENTS

Figure 1:
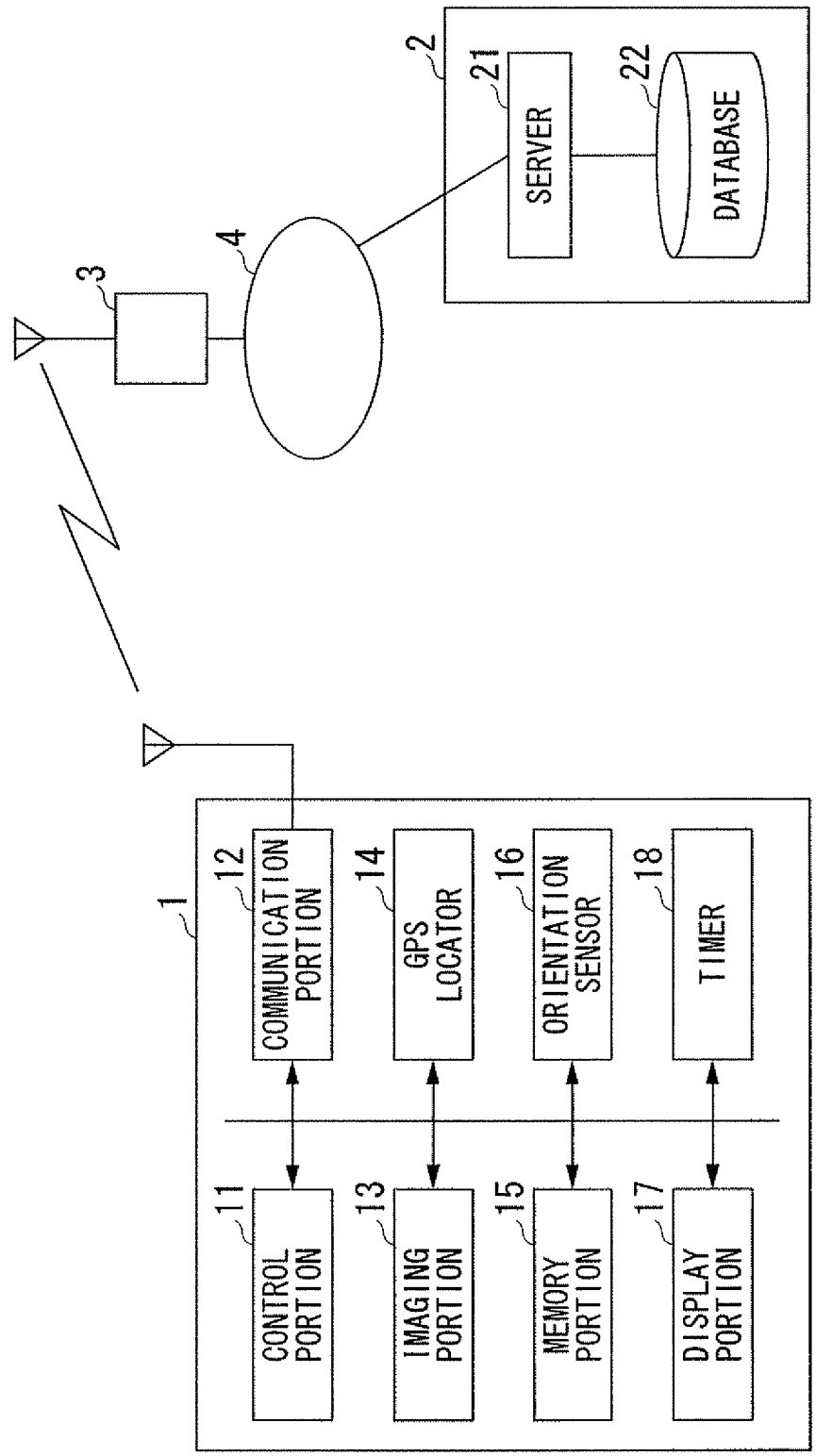
FIG. 1 is a block diagram representing a configuration example of an information acquisition system according to an embodiment of the present invention.

Hereinafter, an embodiment of the present invention will be described with reference to the accompanying drawings. FIG. 1 is a block diagram representing a configuration example of a portable information device (an imaging apparatus) and the information acquisition system according to the embodiment.

In FIG. 1, the information acquisition system includes a digital camera 1 as an example of the imaging apparatus and an information search system 2. The digital camera 1 transmits or receives data to or from the information search system 2 (or an information search server 21 to be described later) through a wireless base station 3 and an information communication network 4 such as the Internet by performing data communication with the wires base station 3 through wireless communication. The imaging apparatus according to this embodiment is an imaging unit-equipped mobile terminal such as the above-described digital camera 1 or a camera-equipped cellular phone.

The digital camera 1 has a browsing function. The digital camera 1 includes a control portion 11, a communication portion 12, an imaging portion 13, a GPS (global positioning system) (a position information acquisition portion) locator 14, a memory portion 15, an orientation sensor 16, a display portion 17, and a timer 18. Here, the wireless communication according to this embodiment includes communication using electric waves, light, sound waves, or the like without using any wire as a transmission channel.

The imaging portion 13 includes a CCD (charge coupled device) image sensor or a CMOS (complementary metal oxide semiconductor) image sensor, a lens, and the like. The imaging apparatus 13 takes an image of a subject (an object of which image is to be taken) and outputs image data to the control portion 11. In the description below, a subject according to this embodiment represents a building structure (a commercial building such as a store, a public building such as a school or a hospital, a factory, a house such as a mansion, an artificial construction such as a steel tower, a bridge, a dam, an amusement park, a statue, or the like).

When receiving a control signal (for example, a control signal output by a peripheral circuit, not shown in the figure, that has detected the pressing of an imaging button B1) from a user for directing to take an image or a control signal (for example, a control signal output by a peripheral circuit, not shown in the figure, that has detected the selection of an icon (a signage) by the user touching the icon that represents a search or the like) for directing an information search, the GPS locator 14 acquires information on the latitude and longitude of the digital camera 1 and outputs the information to the control portion 11.

The orientation sensor 16 is configured by an electronic compass (a geomagnetic sensor) or the like. When receiving a control signal (for example, a control signal output by a peripheral circuit, not shown in the figure, that has detected the press of an imaging button B1) from a user for directing to take an image or a control signal (for example, a control signal output by a peripheral circuit, not shown in the figure, that has detected the selection of an icon (a signage) by the user touching the icon that represents a search or the like) for directing the information search, the orientation sensor 16 detects the orientation, for example, of the serial direction in which the CCD and the lens of the imaging portion 13 are disposed and outputs the detected orientation of the serial direction to the control portion 11 as the orientation information. Alternatively, the orientation sensor 16 can be configured to detect the orientation of the direction toward the subject (that is, the imaging direction) viewed from the user and output the orientation information of the subject to the control portion 11. Here, when an orientation angle is used as the orientation information, the orientation angle is represented in units of degrees, minutes and seconds. For example, the orientation angle of the north side is used as a reference of 0 degree, and the orientation angles of the east side, the south side, and the west side are denoted by 90 degrees, 180 degrees, and 270 degrees in the clockwise direction from the north side with the latitude and the longitude of the position information used as a center point.

When a control signal for directing to take an image is received from a peripheral circuit not shown in the figure by the user's pressing of the imaging button B1 or the like, the control portion 11 assigns image identification information to the picked up image data and writes the pickup up image data, time data acquired from the timer 18, the position information, and the orientation information in the memory portion 15 in association with each image identification information, in the order of imaging.

The display portion 17 displays the image data that is taken by the imaging portion 13 or the image data that is selected by the user as an image to be displayed and is read out from the memory portion 15 by the control portion 11.

In addition, the display portion 17, as described below, displays the image data received from the information search system 2, text data (character data) input by the user, or the like under the control of the control portion 11.

The communication portion 12 transmits or receives data such as image data, text data, a control signal, or the like to or from the information search system 2 through the information communication network 4 by transmitting or receiving data to or from the wireless base station 3 by using wireless communication.

The information search system 2, as shown in FIG. 1, includes the information search server 21 and a database 22. The database 22 can be set up in a memory medium (for example, a memory, an HDD, or the like) inside the information search server 21, a memory medium that is externally attached, or a memory medium of another terminal.

In the database 22, as a building structure table represented in FIG. 2, building structure identification information used for identifying building structures, building names as the names of the building structures, building structure information (information such as an address, a telephone number, a type, and information on peripheral image data of the building structure), the position information such as the latitude and the longitude of the building structure, descriptions of the building structures (information prepared by a store for a case where the building structure is the store), and post information (a comment such as evaluation of a visited user, image data posted by the user, or the like) are stored.

In addition, in the database 22, the map data, in which the registered building structures are disposed with the latitude and the longitude set as the coordinate axes in a two-dimensional plane, is stored. Here, in the map data, each building structure is represented in a position at the latitude and the longitude corresponding to the building structure identification information.

The information search server 21 searches for a building structure that is closest from the position at the latitude and the longitude represented by the position information in the direction represented by the orientation information by using the position information and the orientation information described above which have been input and acquires the building structure identification information of the found building structure.

In addition, the information search server 21 searches for a building structure corresponding to the building structure identification information of the found and acquired building structure from the building structure table and transmits the information of the found building structure (the building structure name, the building structure information, and the like) to the digital camera 1. Alternatively, the information search server 21 can be configured to selectively transmit the information of the building structure to be transmitted to the digital camera 1, for example, depending on the need for the capacity of the transmission data or the reception data or the like. In such a case, the information search server 21 can be configured to retransmit the remaining information out of the information of the building structure to the digital camera 1, for example, in accordance with a predetermined operation (for example, a request from the digital camera 1) or the like.

<Searching for Information on Imaging by Digital Camera 1>

Figure 3:
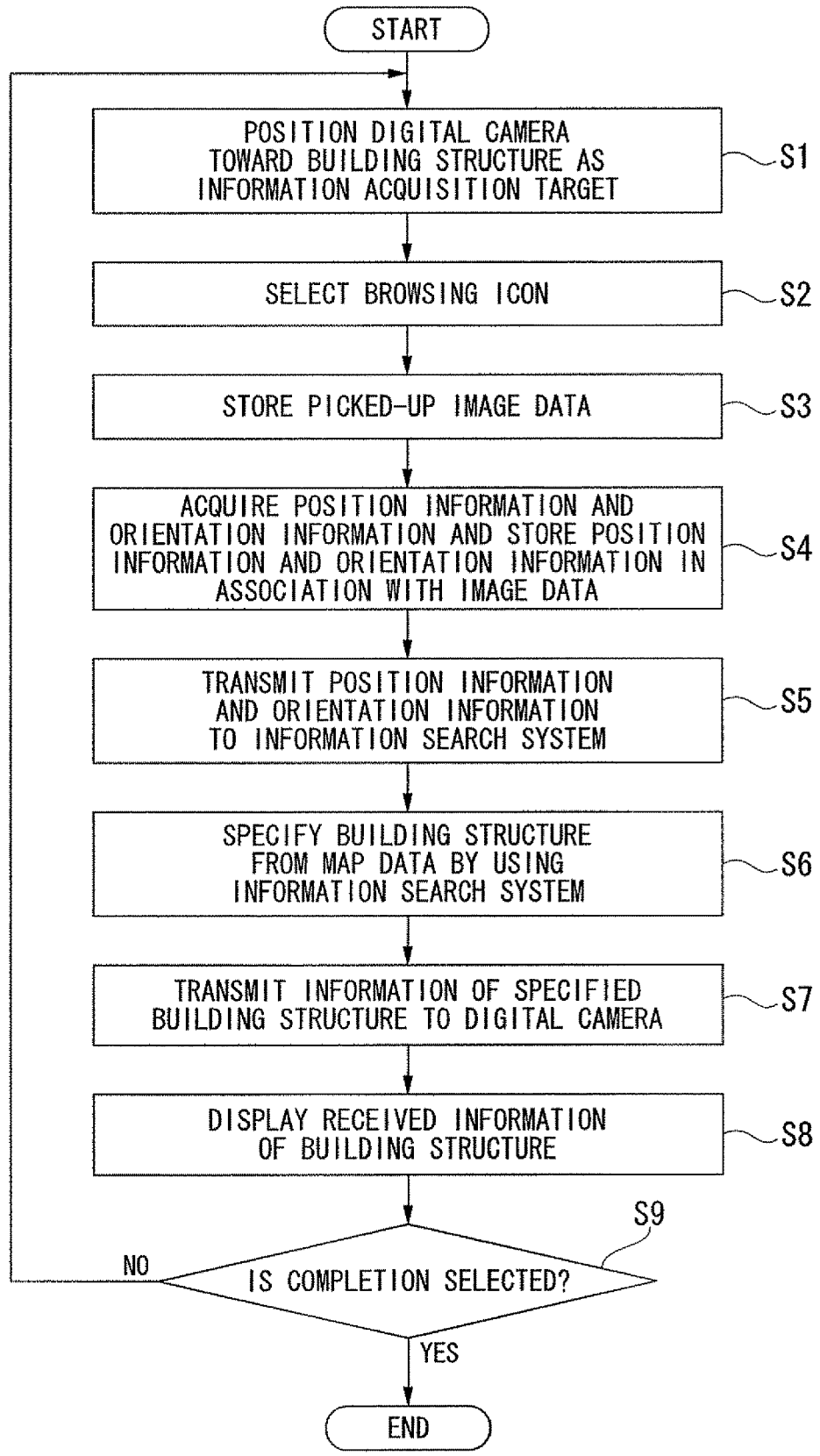
FIG. 3 is a flowchart representing the flow of an information searching process for an image of which the image is taken by a digital camera according to this embodiment.
Figure 4:
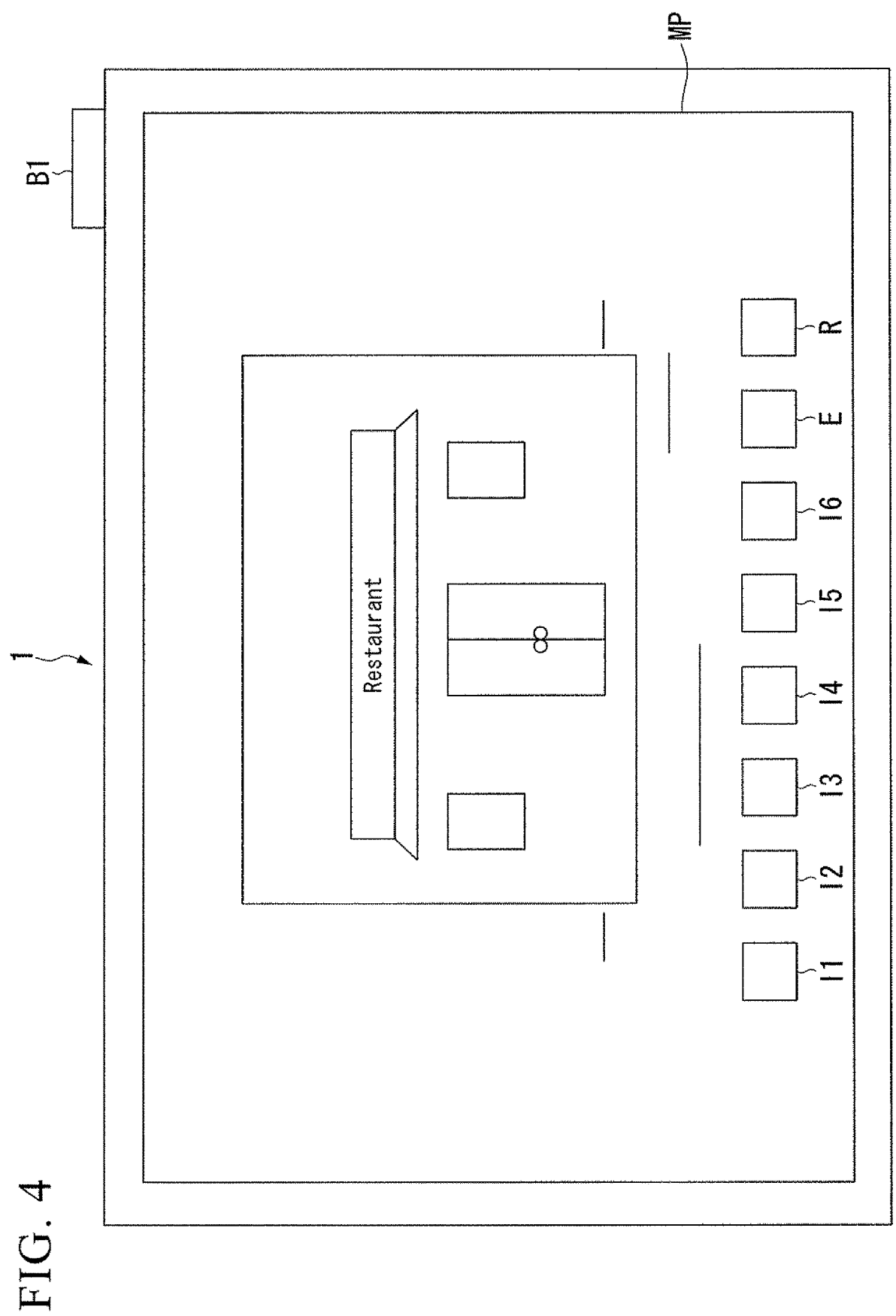
FIG. 4 is a diagram representing an example of a display image displayed in the digital camera according to this embodiment.
Figure 5:
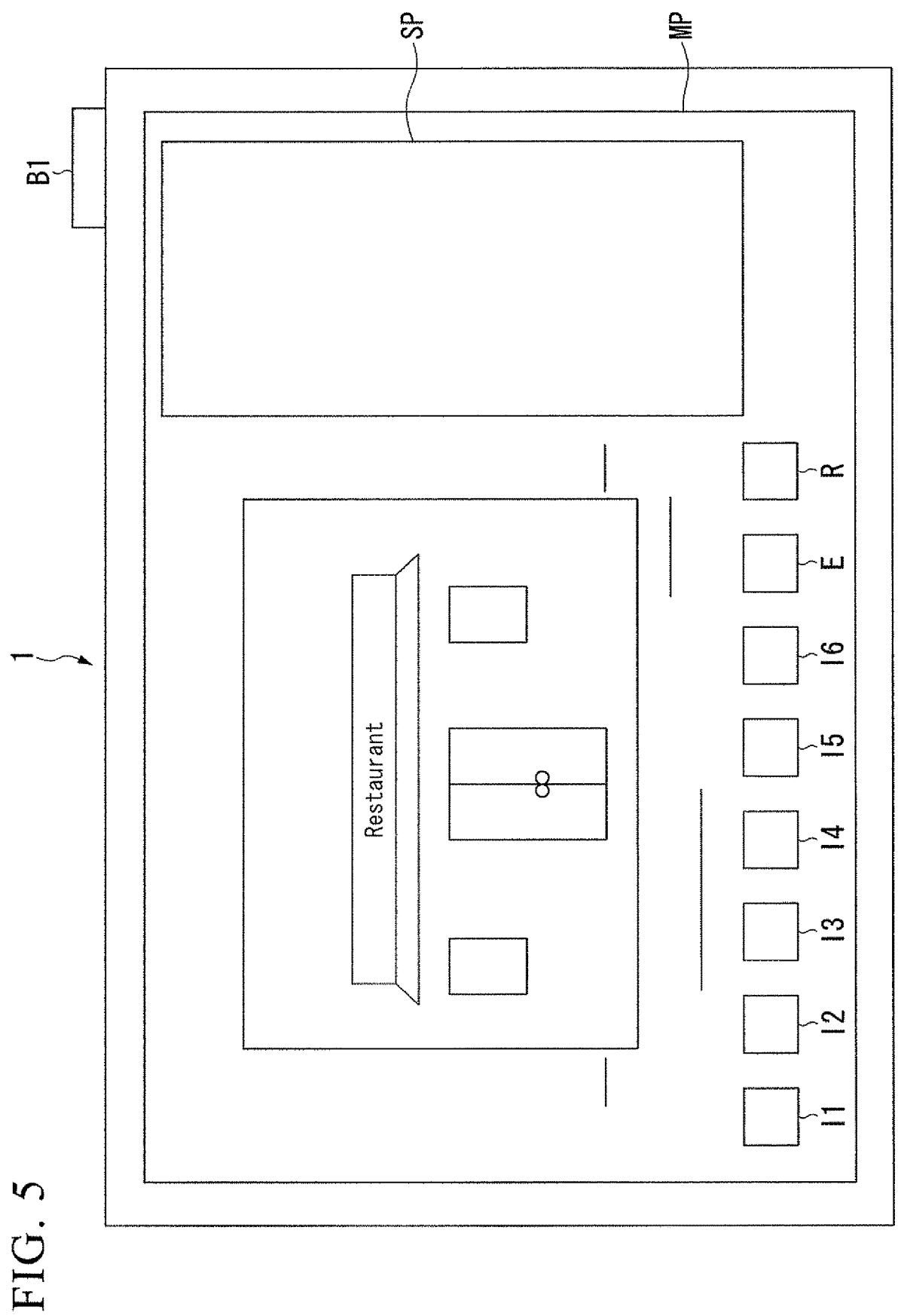
FIG. 5 is a diagram representing an example of a display image displayed in the digital camera according to this embodiment.
Figure 6:
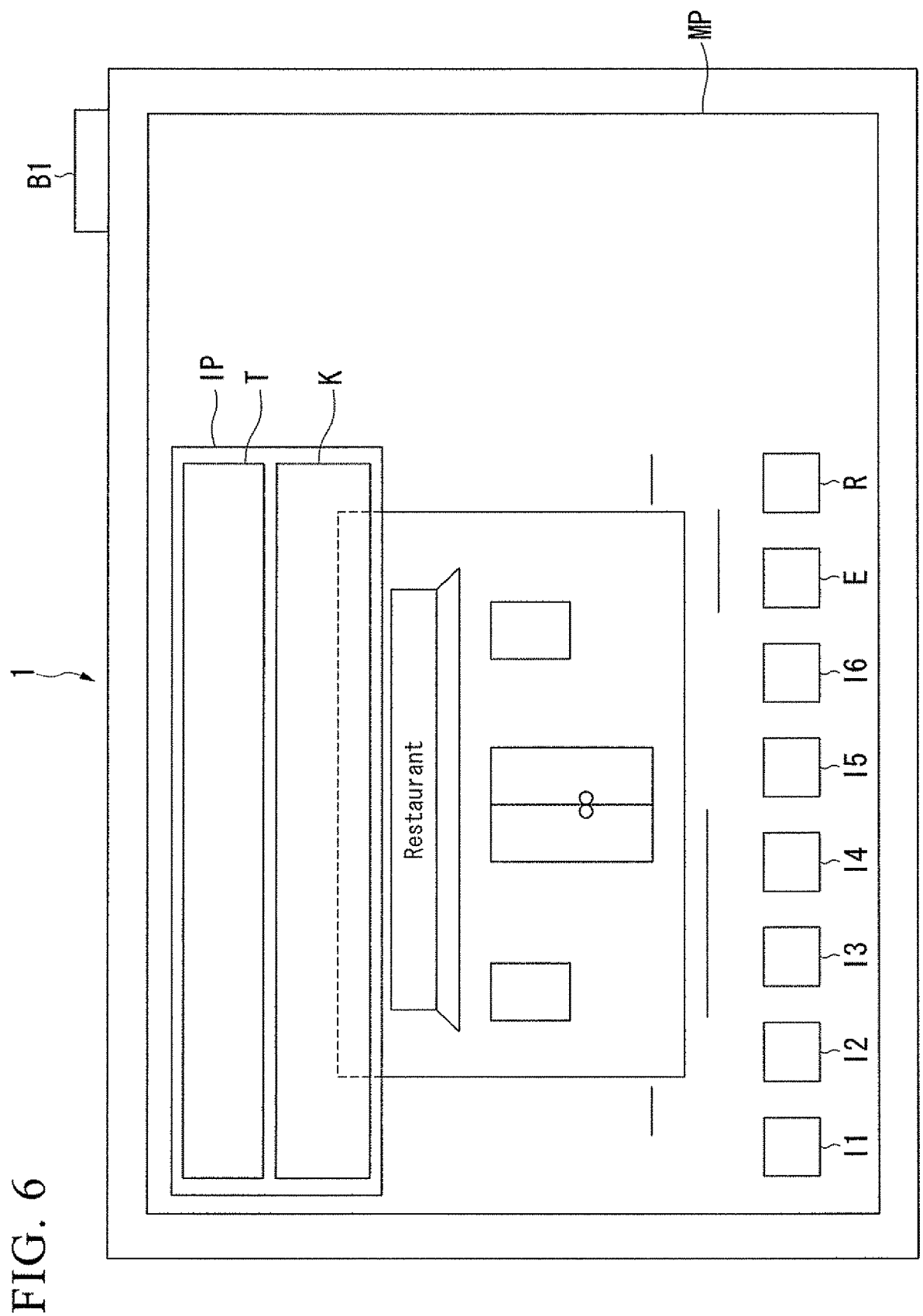
FIG. 6 is a diagram representing an example of a display image displayed in the digital camera according to this embodiment.

Next, the operation of this embodiment will be described with reference to FIGS. 1 and 3 together with FIGS. 4 to 6. FIG. 3 is a flowchart representing an example of an information searching process according to this embodiment for a case where information search is desired to be performed in a state in which the digital camera 1 is in the process of imaging a building structure. FIGS. 4 to 6 are diagrams representing the disposition of a screen displayed in the display portion 17 of the digital camera 1 and the imaging button B1 of the digital camera 1.

In description below, as an example, a case where a user searches for a dining restaurant while walking in a downtown street will be described.

When the user finds a restaurant having an external view of which information is desired to be acquired with the lens of the digital camera 1 positioned toward the restaurant having the favorable exterior view while strolling in the downtown street (Step S1), as shown in FIG. 4, the user touches (presses down) a browsing icon I1 that is set up in the image display field MP of the digital camera 1, thereby the browsing icon I1 is selected (Step S2).

At this moment, the control portion 11 displays image data, of which the image is taken by the imaging portion 13, that is input from the imaging portion 13 in the imaging state, that is, the image data of a restaurant of which the image is taken, as shown in FIG. 4, in the image display field MP through the display portion 17. In addition, the image display field MP (image display portion) according to this embodiment is configured by a touch panel (for example, including a pressure-sensitive type, an electrostatic type, or a sound wave type).

In the above-described Step S2, the browsing icon I1 can be configured to be selected by being touched after the imaging button B1 of the digital camera 1 is pressed down, while the image display field MP in which the image of the restaurant is displayed is viewed.

By touching the browsing icon I1, a signal indicating the selection of the browsing icon I1 is output from a peripheral circuit not shown in the figure to the control portion 11.

Then, the control portion 11 detects the selection of the browsing icon I1 in accordance with the input signal indicating the selection of the input browsing icon I1, assigns image identification information to the image data of the above-described restaurant, the image of which is taken by the imaging portion 13, and writes the image data and the imaging time in the memory portion 15 in association with the image identification information for storing the image data (Step S3).

In addition, when the browsing icon I1 is touched, the control portion1 11 writes the position information acquired by the GPS locator 14 and the orientation information acquired by the orientation sensor 16 in the memory portion 15 in association with the image identification information as related information (Step S4).

Then, after writing the image data and the related information in the memory portion 15, the control portion 11 transmits a search request signal that includes the camera identification information (user identification information assigned to a user or identification information assigned to a digital camera 1) for identifying the digital camera 1, the position information, and the orientation information to the information search system 2 through the communication portion 12 (Step S5). Alternatively, the control portion 11 can be configured to transmit the search request signal to the information search system 2 through the communication portion 12 without writing the image data, the related information, and the like in the memory portion 15 in the above-described Steps S3 to S5.

Next, when the server 21 of the information search system 2 receives the above-described search request signal from the digital camera 1, the server 21 extracts a building structure of a search target from the map data of the database 22 based on the position information and the orientation information that are included in the search request signal. Then, the server 21 transmits each type of information on the building structure table, which is included in the building structure table represented in FIG. 2, including the building structure identification information to the digital camera 1 as search result information including the building structure identification information (Step S7). As an example, at this moment, the server 21 reads out the address of the digital camera 1 on the network which is added for a case where the search request signal is transmitted from the digital camera 1 through the communication portion 12 and transmits the search result information towards this address. Alternatively, in the above-described Step S7, the server 12 can be configured to extract the building structure of the search target from the map data of the database 22 based on the position information and the orientation information, which are included in the search request signal, only in a case where registration of the camera identification information included in the search request signal in the above-described user registration table that is stored in the database 22 is detected. In such a case, when the camera identification information included in the search request signal is detected not to be registered in the above-described user registration table, it is preferable that the server 21 transmits information indicating the need for user registration, for example, on the basis of the camera identification information to the digital camera 1.

Then, when the control portion 11 of the digital camera 1 receives the above-described search result information from the information search system 2 through the communication portion 12, as shown in FIG. 5, the control portion 11 displays the building information (relevant information on the object) in the information display field SP through the display portion 17 (Step S8). For example, when the building structure is a restaurant, the information of the type of the restaurant (Chinese, Japanese, French, Italian, or the like) and a telephone number, an address, and the like of the restaurant are displayed. In addition, the information display field SP represented in FIG. 5 is an example according to this embodiment, and the information display field SP can be displayed such that a part thereof is overlapped with the image of the restaurant. In addition, the information display field SP is a part of the image display field MP. The information display field SP is displayed, for example, by touching the above-described browsing icon I1, a CM icon I2 to be described later, or the like for the selection.

In addition, when the user touches the CM icon I2, the above-described peripheral circuit outputs a signal indicating the selection of the CM icon I2 to the control portion 11.

Accordingly, the control portion 11 detects the selection of the CM icon I2 based on the input of the signal indicating the selection of the above-described CM icon I2 and displays commercial information (a menu, the number of seats, an image inside the restaurant, the day's specials, or the like) of the restaurant that is included in the search result information in the information display field SP through the display portion 17. In addition, when the image data of the image inside the restaurant or the like is included in the commercial information, the control portion 11 displays the image data in the information display field SP.

In addition, when the user touches a post browsing icon I3, the above-described peripheral circuit outputs a signal indicating the selection of the post browsing icon I3 to the control portion 11.

Accordingly, the control portion 11 detects the selection of the post browsing icon I3 based on the input of the signal indicating the selection of the above-described post browsing icon I3 and displays the post information (comment) written by other users, which is included in the search result information, in the information display field SP through the display portion 17.

When there is a plurality of the above-described post information, the control portion 11 displays the plurality of post information in the information display field SP, for example, in the order of the posted date.

The post information can include image data. Thus, when the image data of each food or the image data of the inside of the store that is taken by other users is included in the post information, the control portion 11 displays the image data in the information display field SP through the display portion 17.

Then, for example, when detecting a signal indicating touch to be sled from the left end of the information display field SP toward the right side in FIG. 5, the control portion 11 ends display in the information display field SP and displays the image of the above-described restaurant in the image display field MP as shown in FIG. 4 through the display portion 17. In addition, for example, when detecting a signal indicating the selection of the positing browsing icon I3 in the middle of display of the post information in the information display field SP, the control portion 11 can be configured to end the display in the information display field SP or the display of the post information.

In addition, for example, when displaying the commercial information (or the post information) after displaying the building information in the information display field SP, the control portion 11 can be configured to display the commercial information together with the building information or to display the commercial information after removing the building information from the information display field SP.

In addition, when detecting a signal indicating touch of the image inside the store or the like that is displayed in the information display field SP, the control portion 11 displays an enlarged or reduced image of the image inside the store in the information display field SP (or the image display field MP).

In addition, when the user touches a mail icon I4, the above-described peripheral circuit outputs a signal indicating the selection of the mail icon I4 to the control portion 11.

Accordingly, the control portion 11 detects the selection of the mail icon I4 based on the input of the signal indicating the selection of the above-described mail icon 14 and displays an input field IP as shown in FIG. 6 in a part of the image display field MP through the display portion 17. Here, the input field IP is configured by a text field T to which the user inputs information or the like and a touch screen-type keyboard section K. This input field IP is used for the user to input the positing information, the name of the store, or the year to be described later.

The user inputs the post information such as a food eaten by him, the atmosphere inside the store, or the quality of service served by a store staff to the text field T of the input field IP by using the touch screen-type keyboard section K. Then, as the user touches the mail icon I4 again, the control portion 11 detects the selection of the mail icon I4, sets the text information written in the text field T and the image data displayed in the image display field P together with the camera identification information and the building structure identification information as the post information, and transmits a search request signal including the post information to the information search system 2 through the communication portion 12.

Then, when receiving the above-described search request signal from the digital camera 1, the server 21 writes new post information that has been input to a post field of the building structure table of the database 22 in association with the building structure identification information. Alternatively, the server 21 can be configured to detect whether there is the camera identification information, which is included in the search request signal, in the user registration table of the database 22 before writing the post information, which is written in a post write field G3, in the post field of the building structure table of the database 22. In such a case, the above-described post information can be configured to be written in the post field of the building structure table of the database 22 only in a case where registration of the camera identification information is detected.

Next, the control portion 11 detects whether a completion icon E is selected (Step S9).

Here, when the user touches the completion icon E, the above-described peripheral circuit outputs a signal indicating the selection of the completion icon E to the control portion 11.

Then, when detecting the selection of the completion icon E based on the input of the signal indicating the selection of the completion icon E, the control portion 11 completes the information searching process.

On the other hand, when the signal indicating the selection of the completion icon E is not input, and the selection of the completion icon E is not detected, the control portion 11 returns the process to Step S1, and the imaging process of the digital camera 1 and the information searching process are performed continuously.

When the browsing icon I1 is selected, the control portion 11 can be configured to control the search request signal to be transmitted to the information search system 2 so as to include the picked up image data.

Then, the server 21 can be configured to extract the characteristic amount from the image data by comparing peripheral image data of the building structure information found in the building structure table with the transmitted image data by using the building structure identification information of the building structure extracted from the map data by performing image recognition and to detect whether the similarity is equal to or more than a set value by comparing the characteristic amount extracted from the image data with that of the stored peripheral image data, whereby determining whether the image data corresponds to the building structure of which the image is taken.

At this moment, when the building structure of the peripheral image data and the building structure of the image data are determined not to be similar to each other as the result of comparison, the server 21 can be configured to extract a building structure that is the secondly closest from the above-described position from the map data based on the position information and the orientation information and to compare the characteristic amounts again, whereby the similarity between the peripheral image data of the newly extracted building structure and the image data of which image is taken is evaluated.

In addition, the browsing icon I1 according to this embodiment, similarly to the above-described imaging button B1, can be set up in the imaging apparatus 1 as a browsing button (not shown). In such a case, the function of the browsing button is the same as that of the above-described browsing icon I1. In addition, the imaging button B1 according to this embodiment can be configured to serve as the browsing button by operating a switch portion not shown in the figure. In such a case, the browsing icon I1 or the browsing button is not needed.

<Information Search for Image after Imaging by Using Digital Camera 1>

Figure 7:
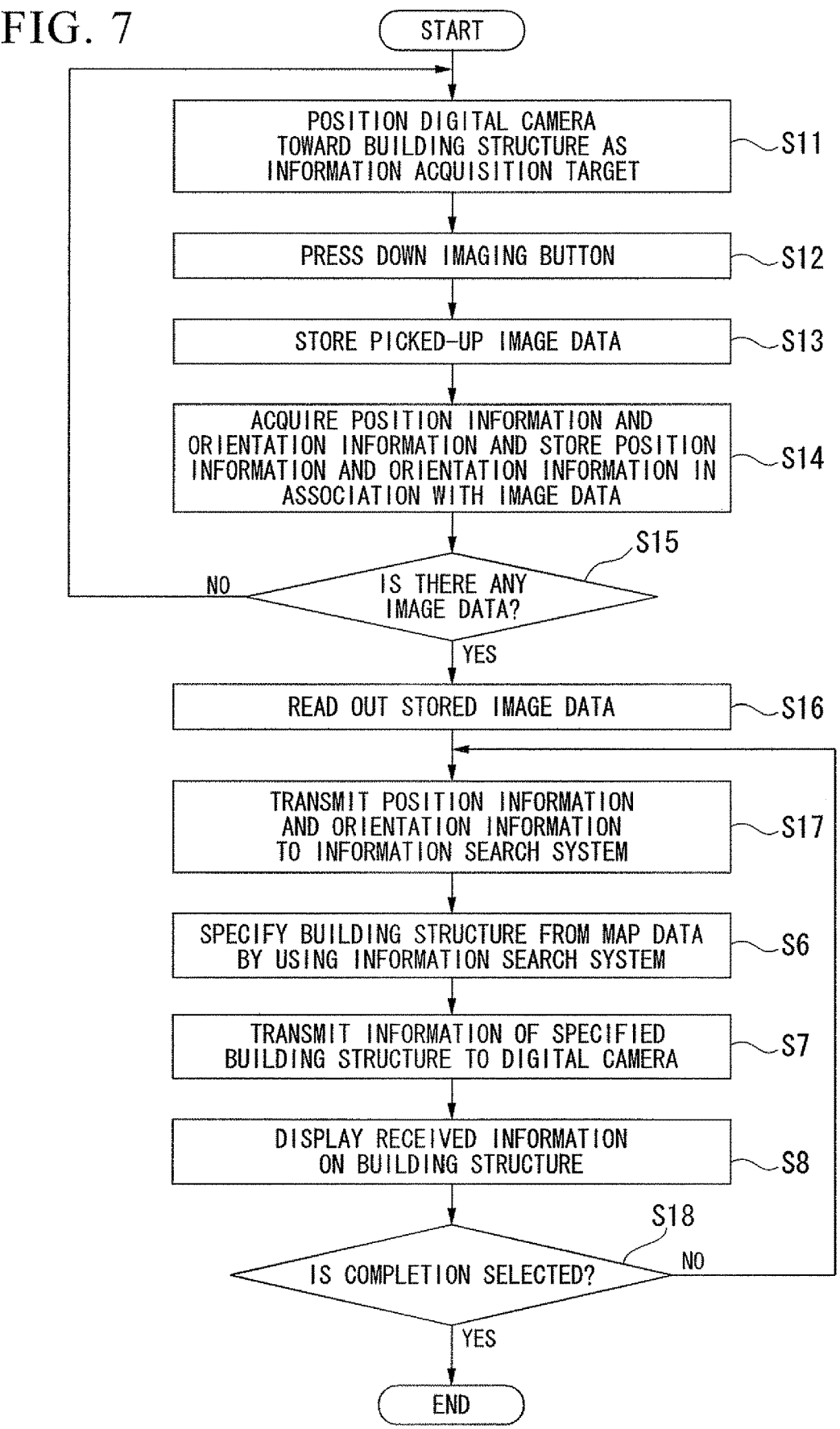
FIG. 7 is a flowchart representing the flow of an information searching process for an image being taken by the digital camera according to this embodiment.

Next, the operation according to this embodiment will be described with reference to FIGS. 1, 7, and 4 to 6. FIG. 7 is a flowchart representing an operation example of an information searching process according to this embodiment in a case where image data stored in the memory portion 15 is read out after imaging an image of a building structure by using the digital camera 1, and the information search for the image data is performed.

In description below, a case where a user searches for a dining restaurant while strolling around a downtown street of Shinjuku, takes images of image data of several restaurants, and then searches for a restaurant for dining out of the above-described restaurants is represented as an example.

When the user founds a restaurant having an exterior view for which an information search is desired to be performed and positions the digital camera 1 toward the restaurant having a favorite exterior view (Step S11) while strolling around the downtown street, the user presses down the imaging button B1 (shutter) set up in the digital camera 1 (Step S12). Here, the control portion 11 displays the image data that is taken by the imaging portion 13, that is, the image data of the restaurant of which the image is taken as shown in FIG. 4, in the image display field P of the display portion 17.

Next, as the user presses down the imaging button B1, the peripheral circuit outputs a signal indicating press-down of the imaging button to the control portion 11.

Then, the control portion 11 detects the press-down of the imaging button B1 based on the input of the signal indicating press-down of the imaging button B1, assigns the image identification information to the image data of the restaurant of which the image is taken by the imaging portion 13, and stores the image data and the time of imaging in the memory portion 15 in association with the image identification information (Step S13).

Then, the control portion 11 writes the position information acquired by the GPS locator 14 and the orientation information acquired by the orientation sensor 16 at the time point when the imaging button B1 is pressed down in the memory portion 15 in association with the image identification information for storage (Step S14).

Next, when the user performs information collection of the restaurant of which the image is taken, the user touches a read-out icon R of the imaging. Accordingly the peripheral circuit outputs a signal indicating the selection of the read-out icon R to the control portion 11.

Here, the control portion 11 determines whether an image is stored in the memory portion 15 based on the input of the signal indicating the selection of the read-out icon R (Step S15).

At this moment, when the signal indicating the selection of the read-out icon R is input, the control portion 11 detects the selection of the read-out icon R, and the process proceeds to Step A16 for starting an information search. In addition, the read-out icon R can be a read-out button (not shown). In such a case, it is preferable that the read-out button, similarly to the imaging button B1, is set up in the main body of the digital camera 1.

On the other hand, when the signal indicating the selection of the read-out icon R has not been input or the image is not stored in the memory portion 15, the control portion 11 returns to Step S11 for performing a new imaging process.

Then, when receiving the signal indicating the selection of the icon R from the peripheral circuit by the user touching the read-out icon R as input, the control portion 11 sequentially reads out image data from the memory portion 15 in the order of imaging in a time series (Step S16) and displays the image data corresponding to a predetermined number set in advance as thumbnail images (or each image data) in the image display field MP through the display portion 17.

In addition, in a case where the thumbnail images are not fit on one page (or one thumbnail image is displayed each time), when the user touches the image displayed in the image display field MP so as to be sled in a predetermined direction, a thumbnail image of the previous page or the next page is displayed in the image display field MP. At this moment, the control portion 11 displays thumbnail images of the previous page or the next page in the image display field MP through the display portion 17 in a case where the signal indicating touch of the image displayed in the image display field MP so as to be sled in the predetermined direction is detected.

Next, when the user selects an interesting image of a restaurant, for example, from among the thumbnail images by touching the image and additionally touches the browsing icon I1, the peripheral circuit outputs the signal indicating the selection of the browsing icon I1 together with the selected image identification signal to the control portion 11.

Accordingly, when receiving a signal indicating press-down of the browsing icon I1 as input, the control portion 11 reads out the position information and the orientation information corresponding to the image identification information from the memory portion 15 by using the image identification information of the selected image data and transmits a search request signal including the camera identification information, the position information, and the orientation information to the information search system 2 through the communication portion 12 (Step S5).

The processes of the following Steps S6 to S8 are the same as those of Steps S6 to S8 represented in FIG. 3, and thus description thereof is omitted here.

Next, the control portion 11 detects whether the completion icon E is selected (Step S18).

At this moment, the control portion 11 receives a signal indicating the selection of the completion icon E as input from the peripheral circuit by the user touching the completion icon E, the control portion 11 ends the browsing process. On the other hand, when not receiving the signal indicating the selection of the completion icon E as input, the control portion 11 returns the process to Step S16, and the process of selecting an image from among the thumbnail images is continued.

<Information Search Using Store Information Input to Digital Camera 1>

Figure 8:
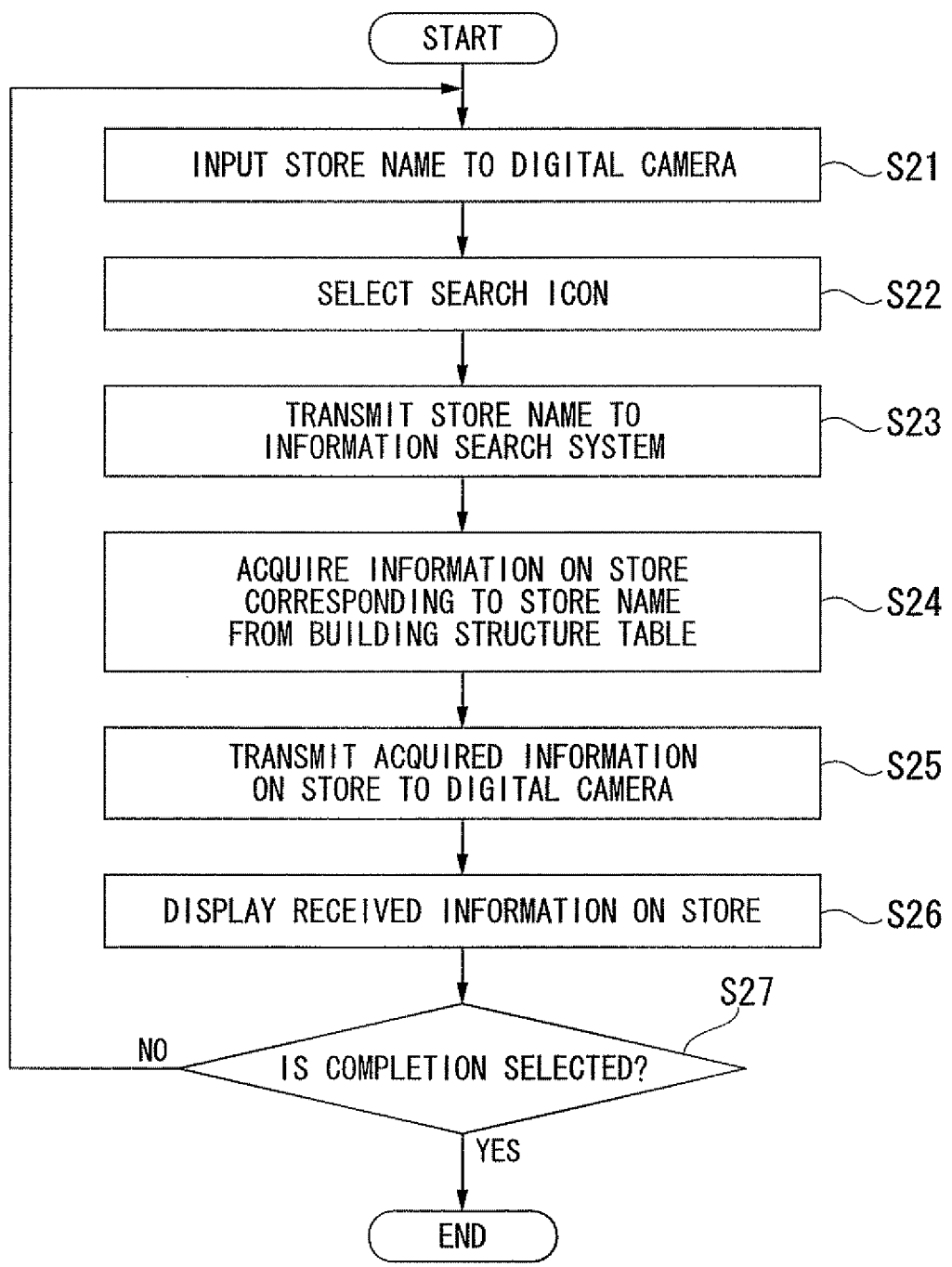
FIG. 8 is a flowchart representing the flow of an information searching process on the basis of the store information that is input to the digital camera according to this embodiment.

Next, the operation according to this embodiment will be described with reference to FIGS. 1, 8, and 4 to 6. FIG. 8 is a flowchart representing an operation example of the information searching process according to this embodiment for a case where an information search is desired to be performed by user's inputting a store name to the digital camera 1 for a restaurant or the like having the input store name from the building structure table, represented in FIG. 2, corresponding to the store name that is stored in the database 22.

In the following description, for example, is a case where the information on a restaurant in Harajuku from a known person is checked.

When the user selects a search icon I5 by touching the search icon I5, the peripheral circuit outputs a signal indicating the selection of the search icon I5 to the control portion 11.

Accordingly, the control portion 11 detects the selection of the search icon I5 based on the input of the signal indicating the selection of the search icon I5 and displays the input field IP as shown in FIG. 6 in a part of the image display field MP through the display portion 17.

Then, the user writes the store name of the restaurant desired to be searched for in the text field T of the input field IP by using the touch screen-type keyboard section K (Step S21) and touches the search icon I5 again (Step S22).

Accordingly, the peripheral circuit outputs text data (character data) of the store name that has been input to the text field T together with the signal indicating the selection of the search icon I5 to the control portion 11.

Then, the control portion 11 detects the selection of the search icon I5 based on the input of the signal representing the selection of the search icon I5, reads in the text data of the store name that has been input to the text field T, and transmits the search request signal together with the camera identification information to the information search system 2 through the communication portion 12 (Step S23).

Next, when receiving the search request signal, the server 21 reads out the information (the store information and each information represented in the table represented in FIG. 2) on the building structure (store) corresponding to the store name from the building structure table of the database 22 (Step S24).

After reading in the store information, the server 21 transmits the acquired store information to the digital camera 1 (Step S25).

When receiving the store information through the communication portion 12, the control portion 11 displays building information in the information display field SP together with displaying the image data of the periphery of the store that is included in the building structure information in the image display field MP represented in FIG. 5 through the display portion 17 (Step S26). For example, the type (Chinese, Japanese, French, Italian, or the like) of the restaurant, the telephone number, and the like are displayed.

In addition, when the user selects a CM icon I2 by touching the CM icon I2, the control portion 11 detects the selection of the CM icon I2 and displays commercial information (a menu, a chef's today's special, or the like) of the restaurant included in the search result information in the information display field SP through the display portion 17.

In addition, when the user selects the post browsing icon I3, by touching the post browsing icon I3, the peripheral circuit outputs a signal representing the selection of the post browsing icon I3 to the control portion 11.

The control portion 11 detects the selection of the post browsing icon I3 based on the input of the signal indicating the selection of the post browsing icon I3 and displays the post information written by other users which is included in the search result information in the display field SP through the display portion 17.

When there is a plurality of the post information, the control portion 11 sequentially displays the plurality of the post information in the information display field SP through the display portion 17. In addition, when image data is also included in the post information, the control portion 11 displays the image data in the information display field SP through the display portion 17.

Then, the control portion 11 detects whether the completion icon E has been selected (Step S27). The detection of the selection of the completion icon E is the same as the process of Step S9 in "<Searching for Information on Imaging By Digital Camera 1>", and thus, description thereof is omitted here.

At this moment, when receiving the signal indicating the selection of the completion icon E as input by user's touching the completion icon E from the peripheral circuit, the control portion 11 ends the browsing process. On the other hand, when not receiving the signal indicating the selection of the completion icon E, the control portion 11 returns the process to Step S21 so as to continue to perform an information search for the store.

<Charging Process for Store Registered in Database 22>

In a case where the above-described building structure is a store (including a restaurant, or a company), the building structure table of the database 22 can be configured such that discount coupon data is stored for each store.

In addition, the server 21 transmits the search result information to which the discount coupon information is added to the digital camera 1.

When the user goes dining or shopping by using the discount coupon information, the server 21 detects whether the user has dined or shopped based on whether the discount coupon information has been used. For example, in a case where the above-described coupon information is a bar code (including a two-dimensional bar code) or the like displayed in the information display field SP of the digital camera 1, a reading portion of the store reads out the bar code and transmits use information indicating the use of the discount coupon information together with the camera identification information, which is transmitted from the digital camera 1, and shopping (or dining) charge to the information search system 2.

Accordingly, when receiving the use information, the server 21 reads out the history information corresponding to the camera identification information added to the use information from the database 22 and differently charges the store with an information providing fee depending on the level of information use out of a level in which the store is used by performing an information search, a level in which the store is used by viewing the provided information on the store, and a level in which the store is used by viewing the post information, that is, the degree of use of the information of the database 22. In addition, the server 21 writes the level of the information search and the history of the use of the discount coupon information for each camera identification information in the history table that is stored in the database 22.

This bar code includes the building structure identification information that represents a store. In the database 22, a charge table, in which the history of charging and an accumulated value of charging corresponding to each store are stored in association with the building construction identification information, is set up.

Then, the server 21 writes the amount of usage and a charge corresponding to the level of information use as the history in the charge table in association with the building structure identification information and adds the new charge to the accumulated value so as to update the accumulated value.

<Process of Adding Points to User>

Each time the user uses the discount coupon information at the store, the server 21 calculates points corresponding to the amount of usage (for example, calculated by multiplying the amount of usage by a point coefficient) for a case where the discount coupon information is used and accumulates the calculated points in the user registration table of the database 22 in association with the camera identification information.

In addition, the server 21 accumulates points corresponding to a value set in advance for a user who has transmitted the post information in the user registration table in association with the camera identification information.

The above-described points can be used, instead of money, together with the discount coupon information in paying the charge.

<Display Order of Post Information>

Here, the server 21 can be configured to allow the digital camera 1 to transmit a nickname and a title as the post information together with the post identification information in the initial stage.

Then, the control portion 11 initially displays only a plurality of nicknames and a plurality of titles in the information display field SP. Then, the user selects the nickname and the title of the post information desired to be known from among the plurality of the nick names and the titles displayed by touching the nick name and the title of the post information. Accordingly, the peripheral circuit transmits the signal indicating of the selection of the nickname and the title and the post identification information of the selected post information to the control portion 11.

Accordingly, the control portion 11 transmits a post information transmission request together with the post identification information to the information search system 2.

Accordingly, the server 21 transmits the text data (character data) and the image data (the entire post information) corresponding to the transmitted post identification information to the digital camera 1.

Here, the server 21 assigns the positing identification information that is used for identification for each of the post information and writes the post information in the user registration table in association with the camera identification information for storage.

In addition, in this embodiment, the control portion 11 can be configured to display the text data in the information display field SP and display the image data in the image display field MP when receiving the text data and the image data from the information search system 2 through the communication portion 12.

In addition, the server 21 searches for the post identification information corresponding to the referred post information from the user registration table and increments the number of references for the camera identification information corresponding to the post identification information in the user registration table.

Then, in the initial display stage of the nickname and the title in which the user can select the post information, the server 21 transmits a display list, in which the nicknames and the titles are displayed in the descending order of the number of times of the selection of the post information, that is, the nickname and the title having more number of times of references comes first to be displayed in the information display field SP to the digital camera 1.

Accordingly, the control portion 11 sequentially displays the nicknames and the titles in the information display field SP in accordance with the display list.

<Process of Displaying Past Image Data>

In addition, according to this embodiment, the database 22 can be configured to have a past image table in which image data acquired by photographing buildings and landscapes at each latitude and each longitude are photographed for each year is stored in association with the latitude and the longitude.

When the user selects the past image icon I6 by touching the past image icon I6, the above-described peripheral circuit outputs a signal indicating the selection of the past image icon I6 to the control portion 11.

Accordingly, the control portion 11 detects the selection of the past image icon I6 based on the input of the signal indicating the selection of the past image icon I6 and displays an input field IP as represented in FIG. 6 in a part of the image display field MP through the display portion 17.

Then, after writing the year (for example, the dominical year) in the text field T by using the touch screen-type keyboard section K, the user touches the past image icon I6 (or the browsing icon I1).

Accordingly, the peripheral circuit transmits the text data of the year together with the signal indicating the selection of the past image icon I6 to the control portion 11.

When detecting the signal indicating the selection of the past image icon I6, the control portion 11 reads in the text data representing the year written in the text field T.

After reading in the data for the year, the control portion 11 transmits the past image search request together with the read year, the position information, the orientation information, and the camera identification information to the information search system 2.

Next, in the information search system 2, the server 21 selects the past image table corresponding to the latitude and the longitude on the basis of the position information of the building structure that is received from the digital camera 1 and is displayed in the image display field P. Then, the server 21 reads in the image data corresponding to the orientation information and the year in the selected past image table and transmits the read image data to the digital camera 1. The digital camera 1 displays the image data corresponding to the year received from the server 21 in the image display field MP through the display portion 17. In addition, in a case where the information or the like for the read-out image is added, the server 21 transmits the added information together with the read-out image data to the digital camera 1.

Accordingly, the user can acquire information indicating that there is a specific building structure for each year in the past or there is only the landscape without any building structure for each year in the past.

Here, when the past image table of the corresponding latitude and the longitude cannot be found, the server 21 searches for the past image table that is located at the latitude and the longitude in the direction of the orientation information and is closest to the latitude and the longitude and extracts the image data therefrom.

In addition, for an era without a photo, a landscape that had lasted in the era or image data of CG (computer graphics) generated by imagination can be stored for each year in the past image table of the memory portion 15 in association with the year, instead of the image data of a photo.

An embodiment relates to an imaging apparatus that has a function of acquiring information on an imaging position of a subject and associating the subject and the information on the imaging position at the time of imaging the subject, and an information acquisition system that acquires information on the subject by using the information on the imaging position.

In the embodiment, the orientation information (for example, an azimuth angle) for acquiring the direction in which the user photographs the subject at the photographing position can be acquired.

In the embodiment, the information on the subject that is photographed by the user, for example, the type of a building structure can be acquired easily.

In the embodiment, not only the position information of the imaging position in which the user photographs a subject but also the orientation information representing the direction, in which the user takes an image of the subject from the position represented by the position information that is acquired by the position information acquisition portion, can be acquired. Accordingly, the orientation of the photographed subject, that is, the direction in which the user disposes the imaging apparatus can be determined.

In the embodiment, the position information and the orientation information obtained by imaging a subject can be acquired. Accordingly, the information on a building structure as a subject of which the image is taken by the user by using the imaging apparatus can be easily acquired by searching a database by using the position information and the orientation information acquired by imaging.

What is claimed is:

1. A portable information device comprising:
    a body;
    an image sensor that is provided in the body;
    a locator that is provided in the body and that outputs position information;
    a memory that stores an image, which is captured via the image sensor, and that stores the position information;
    a display system, having a display and a controller, that is provided in the body and includes a first mode, a second mode and a third mode, wherein
    in the first mode, a real-time view is displayed through the display,
    in the second mode, relevant information on an object relating to the stored image is displayed in a local field in a real-time display based on the position information such that the relevant information is overlapped on the real-time view through the display,
    in the third mode, a past image of the object relating to the stored image is displayed based on the stored position information such that the stored image is overlapped on the real-time view through the display, and
    the second mode is changed to the third mode by a user action while the display system is in the second mode.

2. The portable information device according to claim 1, wherein the display system displays added information on the past image.

3. The portable information device according to claim 2, wherein the added information includes information about a past year corresponding to the past image.

4. The portable information device according to claim 1, wherein the display system displays, in the real-time view through the display, text of the relevant information such that both the past image and the text are overlapped on the real-time view.

5. The portable information device according to claim 1, wherein the display system displays a field in which a past year is input and displays the past image corresponding to the input past year.

6. The portable information device according to claim 1, wherein the past image is a photograph image or a computer graphics image.

7. The portable information device according to claim 1, further comprising:
    an inputter via which information with respect to the object is input.

8. An information acquisition system comprising:
    a server; and
    the portable information device of claim 1.

9. The portable information device according to claim 1, further comprising:
    an orientation sensor that outputs orientation information.

10. The portable information device according to claim 1, wherein the display system outputs a signal based on a touch operation with respect to the display.

11. The portable information device according to claim 1, wherein the display system displays an enlarged or reduced image.

12. A portable information device comprising:
    a body;
    an image sensor that is provided in the body;
    a memory that stores an image, which is captured via the image sensor;
    a display system, having a display and a controller, that is provided in the body and includes a first mode, a second mode and a third mode, wherein
    in the first mode, a real-time view is displayed through the display,
    in the second mode, relevant information on an object relating to the stored image is displayed in a local field in a real-time display based on a result of an image recognition for the stored image such that the relevant information is overlapped on the real-time view through the display,
    in the third mode, a past image of the object relating to the stored image is displayed based on the result of an image recognition for the stored image such that the stored image is overlapped on the real-time view through the display, and
    the second mode is changed to the third mode by a user action while the display system is in the second mode.

13. The portable information device according to claim 12, further comprising:
    at least one of a locator that outputs position information and an orientation sensor that outputs orientation information.

14. An information acquisition system comprising:
a server; and
the portable information device of claim 12.

15. The portable information device according to claim 12,
wherein the past image is a photograph image or a computer graphics image.

16. The portable information device according to claim 12, further comprising:
an inputter via which information with respect to the object is input.

17. The portable information device according to claim 12,
wherein the display system displays an enlarged or reduced image.

18. The portable information device according to claim 12,
wherein the display system displays added information on the past image.

19. The portable information device according to claim 18,
wherein the added information includes information about a past year corresponding to the past image.

20. The portable information device according to claim 12,
wherein the display system displays a field in which a past year is input and displays the past image corresponding to the input past year.

* * * * *